Patented July 10, 1945

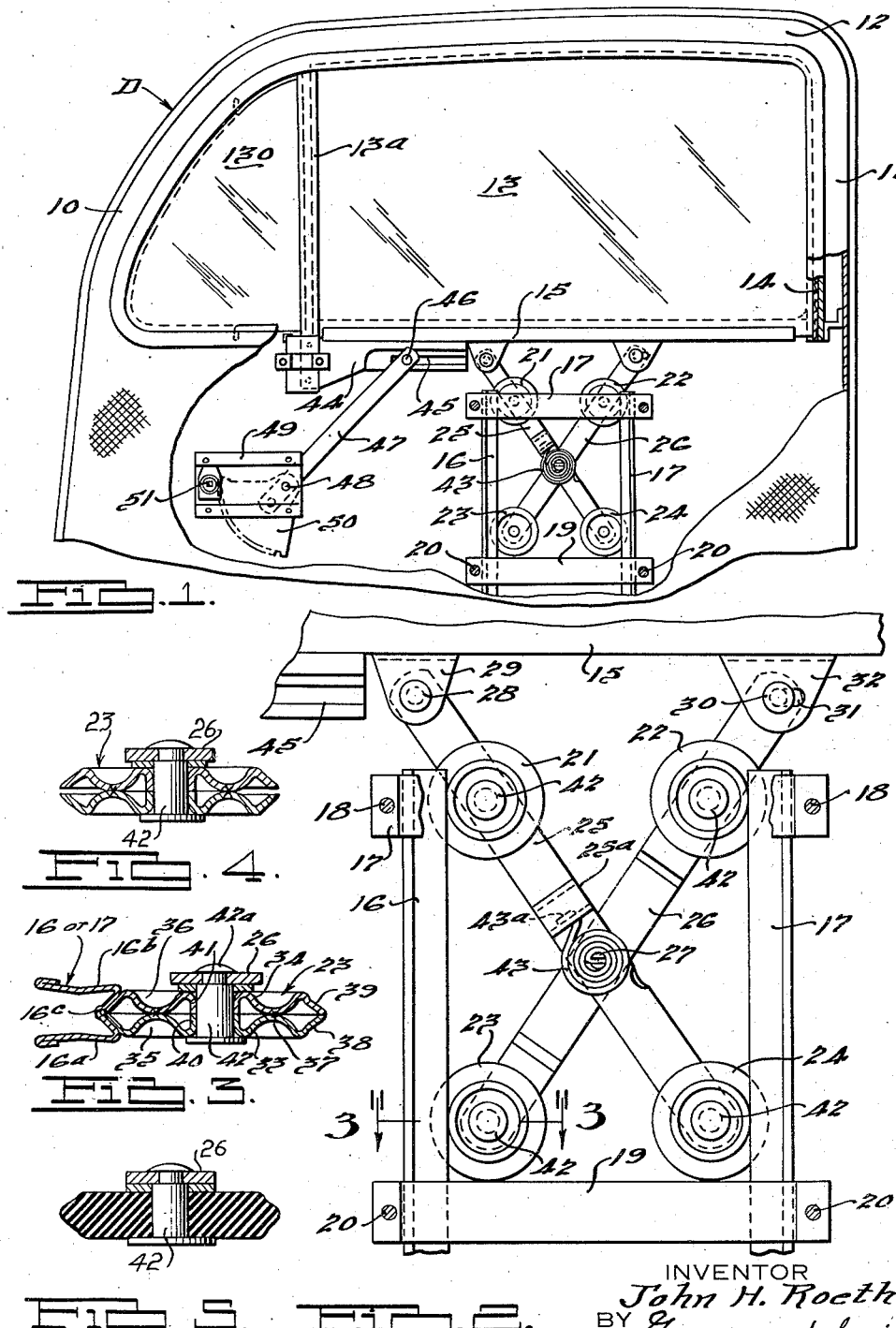

2,379,926

UNITED STATES PATENT OFFICE 2,379,926

WINDOW GUIDE

John H. Roethel, Detroit, Mich., assignor to Marvel Equipment Corporation, Detroit, Mich., a corporation of Michigan Application May 27, 1941, Serial No. 395,340

12 Claims. (Cl. 296—44.5)

This invention relates to window control mechanism, particularly although not exclusively adapted for use in connection with vehicles and especially automobiles. In general the invention contemplates the provision of improved means for guiding the window panel of the vehicle in the desired path, usually in a vertical direction in connection with the principal windows of present day automobiles.

Another object of the invention is to provide guiding means for guiding the window panel intermediate the side edges thereof, such guiding means including improved guide devices or roller guide devices cooperable with fixed guides within the window well and effective not only to hold the window panel against any appreciable tilting in its plane but also to reduce to a minimum frictional resistance to the travel of the panel, thus minimizing the power required to operate the window panel.

A further object of the invention is to provide improved guiding means for the window glass or panel which may be arranged below and near the center of the panel, the improved construction of the guiding means being such as to hold the window panel for travel in a straight line path against any material tendency to tilt or cock or shift transverse to its plane.

It is also an object of the invention to provide improved roller guide mechanism for a sliding window panel which is compact, relatively simple in construction, easy to install, relatively inexpensive to manufacture, efficient and more nearly frictionless in operation than heretofore.

A further object of the invention is to provide an improved center or intermediate guide structure for a window panel, particularly useful in connection with automotive vehicles, in which two pairs of vertically spaced guide devices, particularly rollers or wheels, are mounted upon interconnected arms or members suspended from the lower edge of the window panel and cooperate with longitudinally spaced fixed guides in the window well, the guide devices being held in guiding positions through resilient means. More specifically a single resilient means or spring is provided and mounted in such manner with respect to the supporting arms or members as to serve the purpose of urging all of the guide devices constantly into guiding positions with respect to the upright guides within the window well.

A further object of the invention is to provide improved guiding means comprising vertically spaced pairs of guide devices, such as roller guide devices, depending below the lower edge of the window panel and cooperable in improved manner with a pair of fixed upright guides within the window well, the construction being such as to positively control the window panel and also to hold the panel substantially free from objectionable noises or chattering effects which might result from vibrations of the car or slamming of the door of the car.

Another object of the invention is to provide an improved guide structure for a window panel mounted for up and down movement into and out of the window well of a vehicle body, the guide structure being characterized by the provision of a pair of crossed arms connected at spaced points to the lower edge of the panel and a pair of guide devices carried by each arm and cooperable with spaced upright guides within the well.

Still another object of the invention is to provide a guide structure of the foregoing character in which the crossed arms or members are pivoted at longitudinally spaced points to a member on the lower edge of the window panel and in addition are pivotally connected together at the locality of their crossing, a further feature of the invention being the mounting of the guide devices on the arms respectively at equally spaced points and the provision of resilient means, such as a spring, connecting the arms together at the locality of their crossing and adapted to hold the arms in spread condition so as to urge the guide devices or rollers against the upright guides.

A further object is to provide a guide structure of the foregoing character in which the crossed arms are capable of being connected to the lower edge of the window panel at varying distances apart and in which, as a consequence, the upright guides may also be spaced varying distances apart while at the same time effectively engaged by the guide devices mounted upon the arms. Thus, the guiding means of the present invention is susceptible of a wide latitude in use for varying sizes of windows to suit the requirements of the manufacturers.

Other objects of this invention will appear in the following description and appended claims, reference being had to the accompanying drawing forming a part of this specification wherein like reference characters designate corresponding parts in the several views.

Fig. 1 is an inner fragmentary side elevation, partly broken away and partly in section, of an automobile door embodying the invention.

Fig. 2 is an enlarged fragmentary side elevation illustrating the guiding means.

Fig. 3 is an enlarged section taken substantially through lines 3—3 of Fig. 2 looking in the direction of the arrows.

Fig. 4 is a sectional view, in part similar to Fig. 3, illustrating a self-yielding metallic roller.

Fig. 5 is a sectional view, in part similar to Figs. 3 and 4, illustrating a self-yielding rubber roller.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing there is illustrated a certain embodiment of the invention applied, by way of example, to an automobile door, such as a front door of an automobile. It will be understood, however, that the embodiment herein exemplified in part or in whole may be used in other relations and in other window structures. In particular it will be understood that the guiding means and the window glass operating mechanism may be utilized not only conjointly as herein shown but also separately, and these may be used generally in vehicle bodies or the like not only in connection with window panels which are adapted to be raised and lowered but also window panels, such as the rear quarter windows of automobiles of the closed or convertible types, which are adapted to be shifted horizontally or swung in a generally vertical direction into open and closed positions. Where the invention is used in connection with window panels movable otherwise than in a straight line vertical path, it will be understood that the parts in general will be rearranged to accommodate the particular selected path of movement of the panel.

In Fig. 1 there is illustrated a front door D of an automobile including upright side pillars 10 and 11 joined by a header 12, thus providing a window frame in the form of a closed figure defining a main window opening adapted to be closed in part by means of a vertically slidable glass or other transparent panel 13. In the present instance the remaining portion of the window opening is closed by means of a wing type panel 130 of conventional type, the panels 13 and 130 being separated by a vertical guide bar 13a which may either be attached to the forward edge of the panel 13 or fixed within the window opening to provide a guide for the corresponding edge of the panel 13 when raised and lowered. The window frame pillar 11 may be provided with a groove or glass runway channel 14, terminating at the bottom of the window opening and designed to receive the corresponding edge of the panel 13.

Secured to the lower edge of the glass panel 13 is a channel bar or glass retainer member 15, this bar or member embracing the lower edge of the panel and providing means for the connection thereto of the window regulator and the movable guide means of the present invention. Mounted within the window well of the door or other portion of the vehicle body is a pair of longitudinally spaced upright guides 16 and 17. These guides are secured in fixed position and spaced apart the desired distance by suitable means, such as an upper bracket 17 fastened by screws 18 to the inner metal door or body panel and a lower bracket 19 of similar construction also secured by screws 20 to the inner door or body panel. The guides 16 and 17 are preferably identical in construction. As illustrated in Fig. 3, each guide is in the form of a channel member having spaced generally parallel side flanges 16a and 16b terminating at their outer edges in folded over portions and terminating at their inner edges in a channel shaped web 16c which may be rolled to a generally V-shape to provide parallel tracks for the roller guide devices.

In the present embodiment of the invention two pairs of guide devices in the form of rollers or wheels are provided for cooperation with the fixed upright guides 16 and 17. These guide devices comprise upper longitudinally opposed rollers 21 and 22 and lower longitudinally opposed rollers 23 and 24. All of the rollers are arranged in the same longitudinal plane and in the plane of the guides 16 and 17. The rollers 21 and 24 are longitudinally offset and revolubly mounted at predetermined spaced points upon an arm or member 25. In like manner, the rollers 22 and 23 are revolubly mounted at correspondingly spaced points upon a second arm or member 26. The arms 25 and 26 cross each other so that the rollers or wheels of each arm cooperate with the two guides 16 and 17. The arms 25 and 26 are pivotally connected together at the locality of their crossing through the medium of a pivot or stud 27. This stud is fixed to the arm 26 and extends through an aperture in the arm 25. The arm 25 is free to rotate or swing upon the stud 27.

The cross arm 25 is pivoted through the medium of a stud or shoulder rivet 28 to an angle bracket 29 secured as by spot welding to the bottom of the glass retainer channel 15. The cross arm 26 has a lost motion pivotal connection with the member 15 through the medium of a stud or shoulder rivet 30 fixed to the arm and extending through a horizontal longitudinal slot in an angle bracket 32 secured to the bottom of the retainer channel 15. The pivot 30 extends through a horizontal slot 31 in the bracket 32. The length of the slot is so selected as to permit the desired amount of relative angular movement of the arms under the action of the spring whereby the rollers at all times will engage the guides. Slot 31 also permits the window panel 13 to be lined up at its forward edge with respect to the adjacent edge of the wing panel 130.

The rollers 21 to 24 are all preferably identical in construction and are suitably formed so as to travel smoothly along the guides. These rollers may be formed of metal and urged by separate spring means against the guides or, as hereinafter described, may be self-yielding by reason of the material of which they are formed. In the drawing one form of roller and the manner of mounting thereof are shown in Fig. 3 in connection with the roller 23. Each roller of the illustrated embodiment of Fig. 3 comprises a pair of similar complementary metal disks which are stamped to provide annular concave or dished portions indicated by the portions 33, 34, 35 and 36 in Fig. 3. These annular dished or grooved portions contact, as illustrated, and at this circular line of contact the mating disks of the roller are spot welded together at 37. The disks terminate at the periphery of the roller in converging tapered portions 38 and 39 which together form a tracking edge shaped in accordance with the V-shaped track 16c in each of the guides 16 and 17. Thus, as shown in Fig. 3 each roller has converging tapered portions around its periphery which fit smoothly into the V-shaped track of the guide. From this construction it will be seen that each roller will roll with a smooth bearing upon one of the guides and the interfitting arrangement of the tracking portions will prevent any material lateral movement in a direction transverse to the plane of the window panel. Each roller has a central opening formed by inturned flanges 40 and 41. These flanges provide a cylindrical bearing upon a stud 42 in the form of a shoulder rivet which is secured by riveting at 42a to the arm 26 or the arm 27. Thus, the rollers are free to rotate upon their respective studs or pivots 42 which are fixed to the crossed arm.

Separate spring means may be provided for yieldingly holding the rollers and guides in tracking engagement. Preferably this is accomplished by connecting the arms together at the locality of their crossing by means of a spiral or clock type spring 43. The inner end of this spring is anchored in a kerf or slot in the end of the stud 27, thus being secured to the arm 26. The outer end of the spring is anchored at 43a to an offset or embossed portion 25a of the arm 25. Thus, the opposite ends of the spring are connected to the arms 25 and 26. The spring is installed under predetermined load or tension so that the spring at all times tends to swing the arms relatively to each other. The action of the spring is to spread the arms apart, i. e. to urge the rollers 23 and 24 away from each other. This is permitted by the swinging or pivotal connection of the upper ends of the arm to the brackets 29 and 32. By virtue of this construction it will, therefore, be seen that all of the rollers are at all times urged by the spring 43 into firm guiding engagement with the guides 16 and 17.

In the embodiment of Fig. 3 the roller is shown formed of pressed metal. However, the invention contemplates in lieu of this construction the provision of rollers which may be inherently yieldable or compressible by reason of the material utilized in making the rollers. For example, the rollers may be formed of rubber or rubber-like composition capable of internal yield or of being compressed to a certain degree, or other non-metallic material having similar yielding or compressible characteristics may be employed, such as fiber, leather or the like. As shown in Fig. 5, these rollers may be formed of rubber shaped similar to the roller of Fig. 3 so that the rollers and guides will have interfitting tracking portions and normally the yieldable rubber material of the rollers will be somewhat compressed when inserted between the guides. As shown in Fig. 4, a self-yielding roller may be formed of sheet metal similarly to the roller of Fig. 3 except that the tapered portions 38 and 39 may be initially spaced at their apex so as to be resiliently yieldable toward and from each other. The guides may be so spaced as to normally compress these portions toward each other. As a consequence, the rollers will take up or accommodate any slight variations or irregularities in the guides, due to manufacturing inaccuracies or tolerances and, as in the case of the non-metallic rollers above described, will prevent rattles or chattering during operation of the vehicle.

The window panel 13 may be raised and lowered through the medium of any suitable window regulator mechanism. In the present instance there is shown, by way of example, a typical single arm regulator for this purpose. A bracket 44 is secured to the bottom of the channel 15 and has a longitudinal guide slot or guideway 45 adapted to receive a transverse stud 46 on the outer end of a swinging arm 47 pivoted at 48 to a mounting plate 49 adapted to be secured to the inner door or body panel. A gear sector 50 is riveted to the arm 47 and is driven in the usual manner through a pinion secured to a handle shaft at 51.

I claim:

1. A guide structure for a window panel mounted for up and down movement in a vehicle body having a well, comprising a pair of crossed arms pivotally connected to the lower edge of the panel at points spaced longitudinally in the direction of the plane of the panel, a pair of guide devices carried by each arm and engageable with spaced upright guides within said well, means whereby the pivotal connection of one arm to the panel may be shifted longitudinally with respect to the other connection, and yielding means acting on said arms to urge said devices toward their respective guides.

2. A guide structure for a window panel mounted for up and down movement in a vehicle body having a well, comprising a pair of crossed arms pivotally connected to the lower edge of the panel at points at all times spaced longitudinally in the direction of the plane of the panel, a pair of roller guide devices carried by each arm and engageable with spaced upright guides within said well, means whereby the pivotal connection of one arm to the panel may be shifted longitudinally with respect to the other connection, and yielding means acting on said arms to urge said devices toward their respective guides.

3. A guide structure for a window panel mounted for up and down movement in a vehicle body having a well, comprising a pair of crossed arms having means for connection for relative longitudinal movement at permanently spaced points to the lower edge of the panel, said arms being bodily movable as a unit with the panel, a pair of guide devices carried by each arm, the guide devices of the respective arms being spaced longitudinally in the direction of the plane of the panel for engagement with spaced upright guides within said well, and yielding means for urging said devices toward their respective guides.

4. A guide structure for a window panel mounted for up and down movement in a vehicle body having a well, comprising a pair of crossed arms having means for connection at spaced points to the lower edge of the panel and free to move bodily as a unit with the panel, means for pivotally connecting the arms together at the locality of their crossing, a pair of guide devices carried by each arm below said points and engageable with spaced upright guides within said well, and a spring connecting said arms together at the locality of their crossing and tensioned to urge said guide devices toward their respective guides.

5. A guide structure for a window panel mounted for up and down movement in a vehicle body having a well, comprising a pair of upright guides mounted in the well, a pair of crossed arms pivotally connected for limited relative movement in a longitudinal direction at their upper ends at longitudinally spaced points to a member on the lower edge of the panel and pivotally connected together at the locality of their crossing for relative swinging motion in the longitudinal direction of the plane of the panel, said arms being free to move bodily as a unit with the window panel, and spaced guide devices on each arm engageable with both guides and spaced from said points.

6. A guide structure for a window panel mounted for up and down movement in a vehicle body having a well, comprising a pair of upright guides mounted in the well, a pair of crossed arms pivotally connected for limited relative movement in a longitudinal direction at their upper ends to a member on the lower edge of the panel and pivotally connected together at the locality of their crossing for relative swinging motion in the longitudinal direction of the plane of the panel, said arms being free to move bodily as a unit with the panel, and spaced roller guide devices on each arm arranged between said guides for engagement therewith and spaced below said member.

7. A guide structure for a window panel mounted for up and down movement in a vehicle body having a well, comprising a pair of longitudinally spaced upright guides mounted in the well, a pair of crossed arms pivotally connected at their upper ends to a member on the lower edge of the panel and pivotally connected together at the locality of their crossing for relative swinging motion in the longitudinal direction of the plane of the panel, said arms being free to move bodily as a unit with the panel, spaced guide devices on each arm engageable with both guides, and means whereby the pivotal connection between the upper end of one arm and said member may be shifted longitudinally with respect to the other connection.

8. A guide structure for a window panel mounted for up and down movement in a vehicle body having a well, comprising a pair of crossed arms having means for connection for relative longitudinal movement at permanently spaced points to the lower edge of the panel, said arms being bodily movable as a unit with the panel, guide means carried by each arm, the guide means of the respective arms being spaced longitudinally in the direction of the plane of the panel for engagement with spaced upright guides in said well, and yielding means for urging said guide means toward their respective guides.

9. A guide structure for a window panel mounted for up and down movement in a vehicle body having a well, comprising a pair of crossed arms having means for connection for relative longitudinal movement at permanently spaced points to the lower edge of the panel, said arms being bodily movable as a unit with the panel, guide means carried by each arm, the guide means of the respective arms being spaced longitudinally in the direction of the plane of the panel for engagement with upright guides in said well, and yielding means acting on said arms and tending to relatively move the same to urge said guide means toward their respective guides.

10. A guide structure for a window panel mounted for up and down movement in a vehicle body having a well, comprising a pair of crossed arms having means for connection for relative longitudinal movement at permanently spaced points to the lower edge of the panel, said arms being bodily movable as a unit with the panel, guide means carried by each arm, the guide means of the respective arms being spaced longitudinally in the direction of the plane of the panel for engagement with upright guides in said well, and yielding means acting on said arms and tending to relatively move the same to urge said guide means toward their respective guides, said yielding means comprising a spirally wound spring connected to one arm at the locality of crossing of the arms and connected to the other arm at a distance therefrom.

11. A guide structure for a movable window panel, comprising a pair of crossed arms having means for connection to the window panel at points spaced longitudinally in the direction of the plane of the panel and free to move bodily as a unit with the panel, means for pivotally connecting the arms together at the locality of their crossing, guide means on each arm separate from said connecting means of the arm to the panel and spaced therefrom at a distance from the panel, said guide means movably engaging an upright guide structure for guiding the window panel, and resilient means tending to spread said arms in a longitudinal direction to urge the guide means of the respective arms apart in a longitudinal direction.

12. A guide structure for a movable window panel, comprising a pair of crossed arms having means for connection to the window panel at points spaced longitudinally in the direction of the plane of the panel and free to move bodily as a unit with the panel, means for pivotally connecting the arms together at the locality of their crossing, guide means on each arm movably engageable with an upright guide for guiding the window panel, and resilient means connecting said arms together and tensioned to urge said arms and the guide means of the respective arms apart in a longitudinal direction.

JOHN H. ROETHEL.